United States Patent

Yamashita et al.

[11] 3,868,375
[45] Feb. 25, 1975

[54] PROCESS FOR SEPARATING METHYLTEREPHTHALIC ACID AND 4-METHYLISOPHTHALIC ACID FROM MIXTURES OF THE TWO, AT EACH HIGHER CONCENTRATIONS

[75] Inventors: Gentaro Yamashita; Takeshi Fujii; Noritsugu Saiki, all of Iwakuni; Kiyoshi Nawata; Takanori Shinoki, both of Tokyo, all of Japan

[73] Assignee: Teijin Limited, Osaka, Japan

[22] Filed: May 4, 1971

[21] Appl. No.: 140,213

[30] Foreign Application Priority Data
May 7, 1970 Japan.............................. 45-38831
May 7, 1970 Japan.............................. 45-38832

[52] U.S. Cl........ 260/268 R, 260/501.1, 260/501.2, 260/525
[51] Int. Cl....................... C07c 51/42, C07d 51/64
[58] Field of Search.............. 260/525, 501.1, 501.2, 260/268 R

[56] References Cited
UNITED STATES PATENTS
3,261,842   7/1966   Shenk et al......................... 260/525

Primary Examiner—Lorraine A. Weinberger
Assistant Examiner—R. S. Weissberg
Attorney, Agent, or Firm—Sherman & Shalloway

[57] ABSTRACT

Process for separating and recovering a salt of methylterephthalic acid at higher concentrations from mixtures of methylterephthalic acid and 4-methylisophthalic acid, which comprises dissolving a mixture of methylterephthalic acid and 4-methylisophthalic acid in water, in the form of a mixture of salts with at least one base selected from the group consisting of:
a. ammonia,
b. aliphatic, straight chain $\omega$, $\omega'$-diamines of even number of carbon atoms within the range of 2 - 12,
c. diamines of the formula,

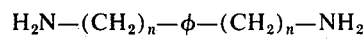

in which $n$ is a positive integer of 1 - 3, and $\phi$ is a p-phenylene group or p-cyclohexylene group,
d. bis-(p-aminocyclohexyl) methane, and
e. piperazine, to form an aqueous solution of the salts of the acid mixture, concentrating and/or cooling the solution to cause precipitation of methylterephthalic acid salt or the salt mixture composed mainly of methylterephthalic acid salt, and separating the so precipitated salt or salt mixture.

38 Claims, 4 Drawing Figures

PROCESS FOR SEPARATING METHYLTEREPHTHALIC ACID AND 4-METHYLISOPHTHALIC ACID FROM MIXTURES OF THE TWO, AT EACH HIGHER CONCENTRATIONS

This invention relates to a process for separating methylterephthalic acid (MTA) and 4-methylisophthalic acid (MIA) from the mixture of MTA and MIA, each at higher concentrations. More particularly, the invention relates to a process which comprises dissolving a mixture of MTA with MIA in water in the form of salts with the base selected from specific groups, recovering the MTA salt and MIA salt separately, at higher concentrations than their respective ratios in the starting MTA—MIA mixture, utilizing the difference in solubility of the MTA salt and MIA salt in water, and, if desired, further precipitating either one or both of the MTA salt and MIA salt with addition of an acid, and separating and recovering the precipitate, thereby recovering MTA and/or MIA at higher concentrations than their respective ratios in the starting mixture.

MTA is a white, solid compound at normal temperature, which is expressed by the formula, and MIA is also a white, solid compound at normal temperature, expressed by the formula, It is rather difficult to make either MTA or MIA by itself, and they are normally obtained as mixtures.

For instance, MTA—MIA mixtures can be obtained by oxidation of pseudocumene with, for example, nitric acid or molecular oxygen, e.g., air, under suitable conditions. General disclosures of such processes can be found, for example, in U.S. Pat. Nos. 3,227,752; 3,008,983, and 3,334,135.

According to studies it has been found that MTA—MIA mixtures can be produced at high yield and high selectivity when pseudocumene is oxidized with molecular oxygen under the following conditions (1) 3 – 25 wt. parts per 1 wt. part of pseudocumene of acetic acid is used as the solvent, (2) under at least 0.2 atmosphere of partial pressure of oxygen, (3) and reaction temperatures ranging from 100° – 220°C., (4) in the presence of a catalytic composition composed of cobalt compound, or cobalt compound and manganese compound, plus bromine compound, which are soluble in the acetic acid solvent under the reaction conditions, of the quantity satisfying the general formula (I) and (II) below:

$-1.9 - 0.016 \times T$    log (A.B)    $-1.30 - 0.0115 \times T$ .. (I)

$1.60 - 0.011 \times T$    log (B/A)    $1.80 + 0.0115 \times T$ .. (II)

in which

A is the weight of cobalt metal in the cobalt compound employed, or cobalt metal plus manganese metal, in the cobalt compound plus manganese compound employed, divided by the weight of charged pseudocumene and that of acetic acid, B is the gram-atom number of bromine in the bromine compound employed, divided by the gram-atom number of cobalt metal in the cobalt compound employed, or of cobalt and manganese metals, in the cobalt and manganese compounds employed, and T is the reaction temperature selected from the range of 100° – 220°C.

Furthermore, it has been confirmed by studies, that the MTA—MIA mixtures can be selectively produced from pseudocumene at high yields, through such procedures as:

A. oxidation of pseudocumene with molecular oxygen (1) using a compound of a heavy metal, such as of cobalt or manganese, in an amount of 0.02 – 2 parts by weight, as the metal, per 100 parts by weight of psuedocumene, and a bromine compound of an amount corresponding to 0.1 – 2 atoms as bromine atom, per atom of the metal of the heavy metal compound, as the catalyst, (2) in the substantial absence of solvent, (3) at temperatures ranging from 100° – 250°C., (4) and at partial pressure of oxygen of at least 0.2 atmosphere, or B. oxidation of pseudocumene with molecular oxygen, using a compound of a heavy metal such as of cobalt or manganese, and a bromine compound as the catalyst, in such solvent as benzene, mono- and di-chlorobenzenes, and t-butylbenzene, etc., at temperatures ranging from 100° – 250°C.

As another embodiment of the air-oxidation process of pseudocumene, the desired MTA—MIA mixtures can be formed by the catalytic action of a cobalt compound which is soluble in acetic acid solvent, in the absence of a bromine compound in the catalyst system. In such practice, favorable results can be obtained when at least 6 molar times the pseudocumene of acetic acid is used for the above oxidation process at approximately 90° – 150°C., using at least 0.2 gram-atom, as cobalt metal, per gram-mol of pseudocumene of a cobalt compound, for example, cobalt acetate, as the catalyst.

According to those pseudocumene oxidation methods described above, MTA—MIA mixtures at weight ratios as 50 – 70 percent of the former to 30 – 50 percent of the latter, can be obtained.

MTA—MIA mixtures can be formed through still further means other than those above-described. For example, xylene mixtures may be chloromethylated, and then oxidized with nitric acid and/or air, to form such mixtures.

The MTA—MIA mixtures used as the starting material in the invention may be prepared by any of the known methods such as above-described, i.e., the invention is in no way restricted by the method of making the starting mixtures.

Because both MTA and MIA are monomethyl-substituted benzenedicarboxylic acid, they are useful as the starting materials for plasticizing agent, alkyd resins unsaturated polyesters, etc. They are industrially highly valuable intermediate products, particularly because they have better solubility in various alcohols such as butanol, octanol, ethylene glycol, propylene glycol, glycerine, pentaerythritol, etc., than that of terephthalic or isophthalic acid, and are consequently easily reactable with those alcohols. Furthermore, the plasticizers, alkyd resins or unsaturated polyesters prepared therefrom exhibit excellent heat stability and mechanical properties.

However, while the two carboxyl groups are bonded at the p-position of the benzene ring in MTA, those in MIA are bonded at the m-position of the benzene ring. Due to this difference, logically they have different suitable utilities. For instance, MTA can form substantially linear, highly crystalline, high melting point fiber- or film-forming polyamides, through such procedures as reaction with diamines such as hexamethylenediamine, dodecamethylenediamine, bis-(4-aminocyclohexyl) methane, etc., to be formed into the diamine salt of MTA, and subsequent polycondensation of the diamine salt.

While, MIA can also form substantially linear polyamides through reaction with such diamines as above-named, the products show lower melting point and crystallinity than those of the polyamide derived from MTA, and have different utilities from those of the latter, from obvious reasons. Similarly, the plasticizers, alkyd resins, unsaturated polyesters, etc., derived from MTA exhibit different properties from those of the products derived from MIA.

For the foregoing reasons, it is necessary to separate MTA and MIA in the mixtures, and to recover each of them at higher concentrations than their ratios in the mixtures.

Although both MTA and MIA are sublimating white solids, recovery of MTA and MIA separately each at higher concentrations from MTA—MIA mixtures cannot be achieved by sublimation or distillation process.

Again, MTA—MIA mixtures are soluble in various organic solvents, e.g., alcohols such as methanol, ethanol, and propanol; glycols such as ethylene glycol and propylene glycol; ethers such as diethyl ether, dioxane, tetrahydrofuran, and methyl cellosolve; organic carboxylic acids such as acetic acid and propionic acid; dimethylformamide, dimethylacetamide, and dimethylsulfoxide, but it is not easy to separate MTA and MIA each at higher concentrations with high efficiency, using those organic solvents. This is because differences in solubilities of MTA and MIA in the organic solvents named above are extremely minor. Consequently, it is difficult to separate MTA from MIA in the MTA—MIA mixtures, by a recrystallization or extraction method using such organic solvents.

We therefore attempted the separation by first converting the MTA-MIA mixtures to the corresponding lower dialkyl esters such as methyl or ethyl esters, and separating the MTA and MIA by distillation, utilizing the differences in the esters' boiling points, to discover that substantially no difference in boiling point exists between lower dialkyl esters of MTA and MIA. Thus it was confirmed that the effective separation cannot be achieved through the esterification and distillation, a separation process normally applied to mixtures of dicarboxylic acid isomers. Furthermore, those esters show no appreciable difference in solubility in such organic solvents as named above, and therefore the esters cannot be smoothly separated by a recrystallization or extraction method.

Accordingly, the main object of the invention is to provide a process for separating MTA and MIA from mixtures of the two, in the form of their salts with a specific base, at higher concentrations.

Another object of the invention is to provide a process for separating and recovering MTA and MIA from mixtures of the two, each at higher concentrations, by further precipitating the above MTA salt and/or MIA salt, which have been separated and recovered at higher concentrations, with addition of acid, and separating and recovering the precipitate.

Still another object of the invention is to provide a process for separating and recovering, from mixtures of MTA and MIA, at least MTA as a salt with a base or as the free acid, of high purity.

Other objects and advantages of the invention will become apparent from the following descriptions.

According to the invention, the foregoing objects and advantages can be achieved by the process comprising dissolving a mixture of methylterephthalic acid (MTA) and 4-methylisophthalic acid (MIA) in water as mixture of salts with at least one base selected from the group consisting of, a. ammonia,
b. aliphatic, straight chain $\omega,\omega'$-diamines of even number of an carbon atom within the range of 2 – 12,
c. diamines of the formula, $$H_2N-(CH_2)_n-\phi-(CH_2)_n-NH_2$$

in which n is a positive integer of 1 – 3, and $\phi$ is a p-phenylene group or p-cyclohexylene group, d. bis-(p-aminocyclohexyl) methane, and
e. piperazine, to form an aqueous solution of the salts of the mixture of acids, concentrating and/or cooling the aqueous solution to precipitate the methylterephthalic acid (MTA) salt or a mixture of salts composed chiefly of MTA salt, and separating the salt or salt mixture thereby recovering the salt of MTA with the specified base at higher concentration than the MTA content of starting MTA—MIA mixture.

The invention will be hereinafter explained in greater detail.

As indicated above, the starting MTA-MIA mixture to be subjected to the present process may be prepared by any known means. The ratio of MTA to MIA in the mixture is again optional. The separation in accordance with the invention is achieved with high efficiency and advantage when the process is applied to MTA—MIA mixtures containing at least 15 percent by weight, preferably at least 25 percent by weight, of MTA. The starting MTA—MIA mixtures may contain minor amounts of impurities without appreciable detrimental effect, such as the liquid medium used in the preparation of the mixtures, e.g., acetic acid; oxidation intermediate products such as dimethylbenzoic acid, dimethylbenzaldehyde, methylformylbenzoic acid, etc.; by-products of the mixture-forming reaction such as trimellitic acid, nitrated products of MTA, MIA, etc.; and oxidation catalyst. Obviously, the less impurities the better, but the greatest part of those intermediate products and side-products of the oxidation migrate into the solution side when the mixture is subjected to the present separation process, and do not provide a serious obstacle to the intended recovery of the MTA salt or MIA.

We have engaged in extensive studies in search of a process for separating MTA and/or MIA from conventional MTA—MIA mixtures at higher concentrations, and arrived at the surprising discovery that once the mixture is converted to the mixture of salts with at least one base selected from the group consisting of:

a. ammonia,
b. aliphatic, straight chain ω,ω'-diamines of an even number of carbon atoms within the range of 2 - 12,
c. diamines of the formula, in which n is a positive integer of 1 - 3, and $\phi$ is p-phenylene group or p-cyclo-hexylene group,
d. bis-(p-aminocyclohexyl) methane (PACM), and
e. piperazine, such salt of MTA and that of MIA show considerably different solubility in water. Consequently, it has been found that, utilizing this difference in solubility, the MTA salt and MIA salt can be separated and recovered, at markedly higher concentrations than the MTA/MIA ratio in the starting MTA—MIA mixture.

Among the aforenamed bases, (a), (d), and (e) are self-evident, and no further explanation is believed necessary.

As the ω,ω'-diamines of (b), ethylenediamine, tetramethylenediamine, hexamethylenediamine, octamethylenediamine, decamethylenediamine, and dodecamethylenediamine can be named. While any of the foregoing are useful for the purpose of this invention, particularly hexamethylenediamine and dodecamethylenediamine are particularly preferred bases.

As the diamines of group (c), for example, p-xylylenediamine, p-di-(β-aminoethyl) benzene, p-di-(aminomethyl) cyclohexane, and p-di-(β-aminoethyl) cyclohexane, etc., are preferred.

Among the specified bases, ammonia of (a) should be used in the amount of at least 2 molar times that of MTA—MIA mixture, to form the salt of MTA—MIA bonded with 2 molar times thereof of ammonia.

When a base or bases of (b) through (e) are used, the salts of MTA—MIA mixture bonded with equimolar amount thereto of the base may be formed.

For the formation of such salts, a generally preferred practice is to use slightly excessive amount of the base than the stoichiometric amount of the base to be bonded with the mixture, i.e., if the base is ammonia, an amount slightly more than 2 molar times the mixture, e.g., 2.05 - 2.2 molar times, may be used. If the base is any of the groups (b) through (e), slightly more than the equimolar amount of such a base, e.g., 1.03 - 1.1 mol times per mol of the mixture may be allowed to act on the mixture.

The salts can be formed, for example, by directly reacting a suitable base or bases with the MTA—MIA mixture; or by adding the base or aqueous solution thereof to a suspension of the mixture in water; or by adding the MTA—MIA mixture as it is or as an aqueous suspension thereof to an aqueous solution of the base. In the subject invention, in short, the MTA—MIA mixture is first converted to the mixture of the salts with the specified base, and substantially all of the salts are dissolved in water at suitable temperatures, thereby precipitating and recovering MTA salt, or MTA salt-MIA salt mixture of higher MTA salt content, utilizing the difference in solubilities in water between the two salts. The particulars of each step, e.g., method of conversion to the salts, means employed therefor, method of dissolving the salts in water, and dissolving means, are not critical.

To assist the understanding of this invention, four bases among those of groups (a) through (e), i.e., ammonia, hexamethylenediamine, dodecamethylenediamine and p-xylylenediamine, are selected, and solubilities in water of the salts of those bases with MTA as well as with MIA are shown in the attached drawings, FIGS. 1 through 4. In the graphs given as the drawings, the axis of abscissae denotes temperature (°C.), and axis of ordinates, the dissolved amount (g) of each salt in 100 g of water at the temperature specified at the axis of abscissae.

Figure 1:
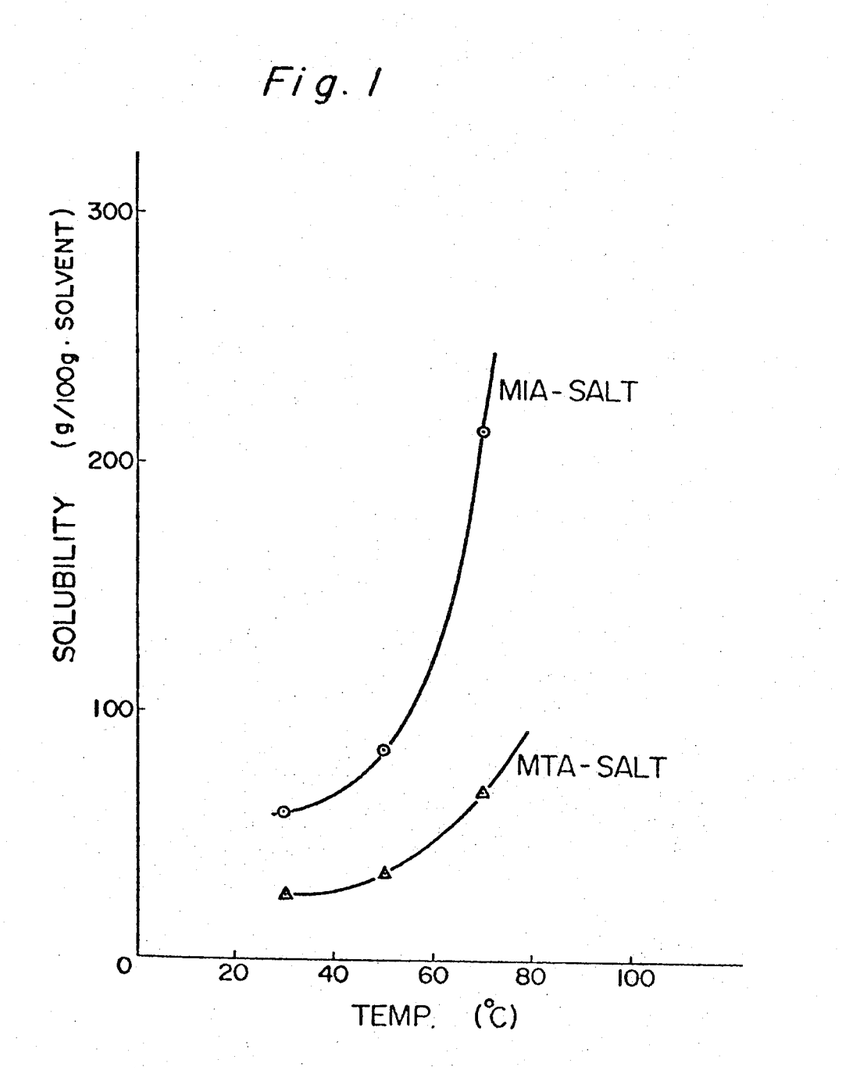
Figure 2:
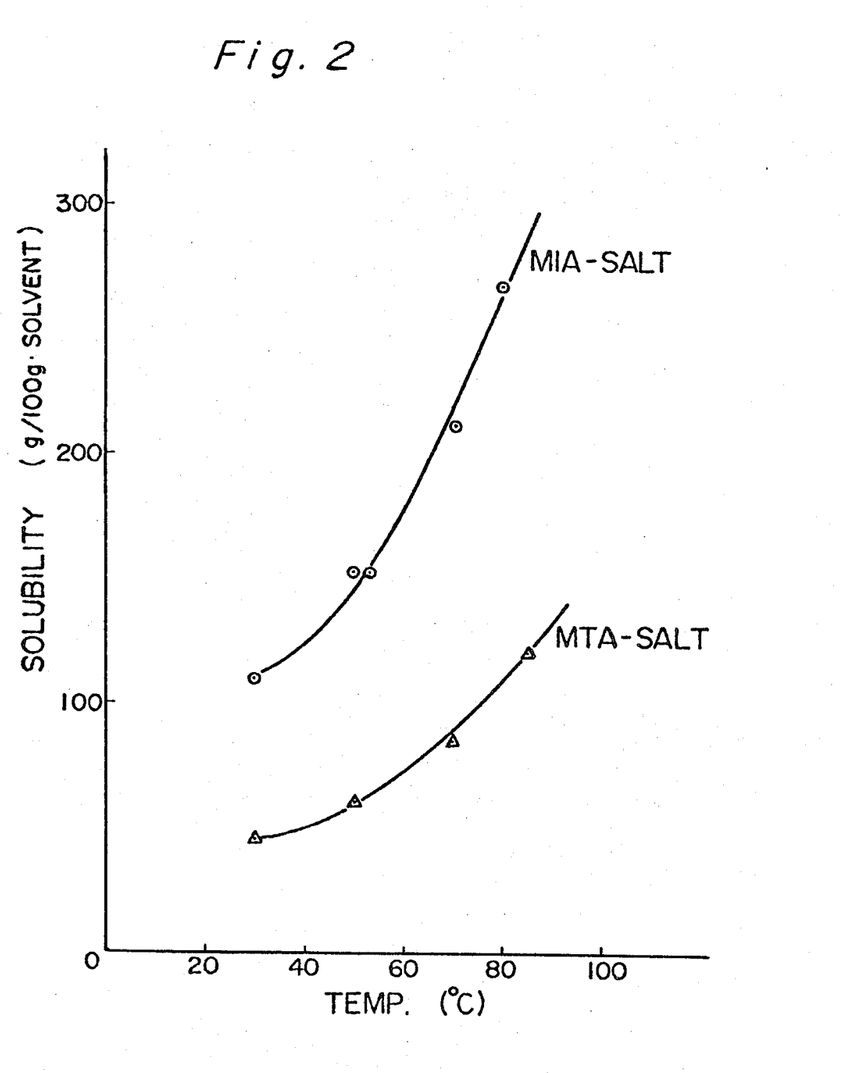
Figure 3:
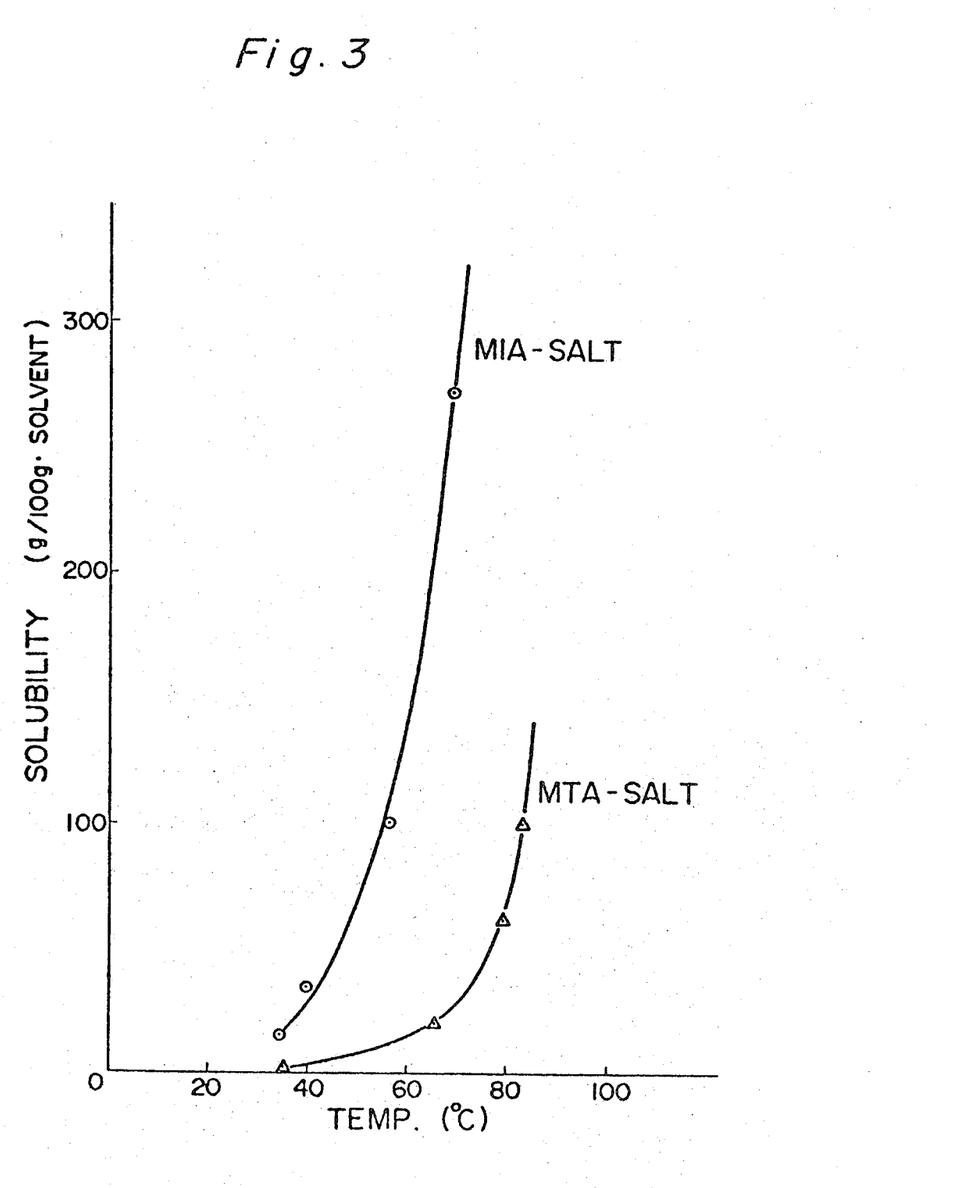
Figure 4:
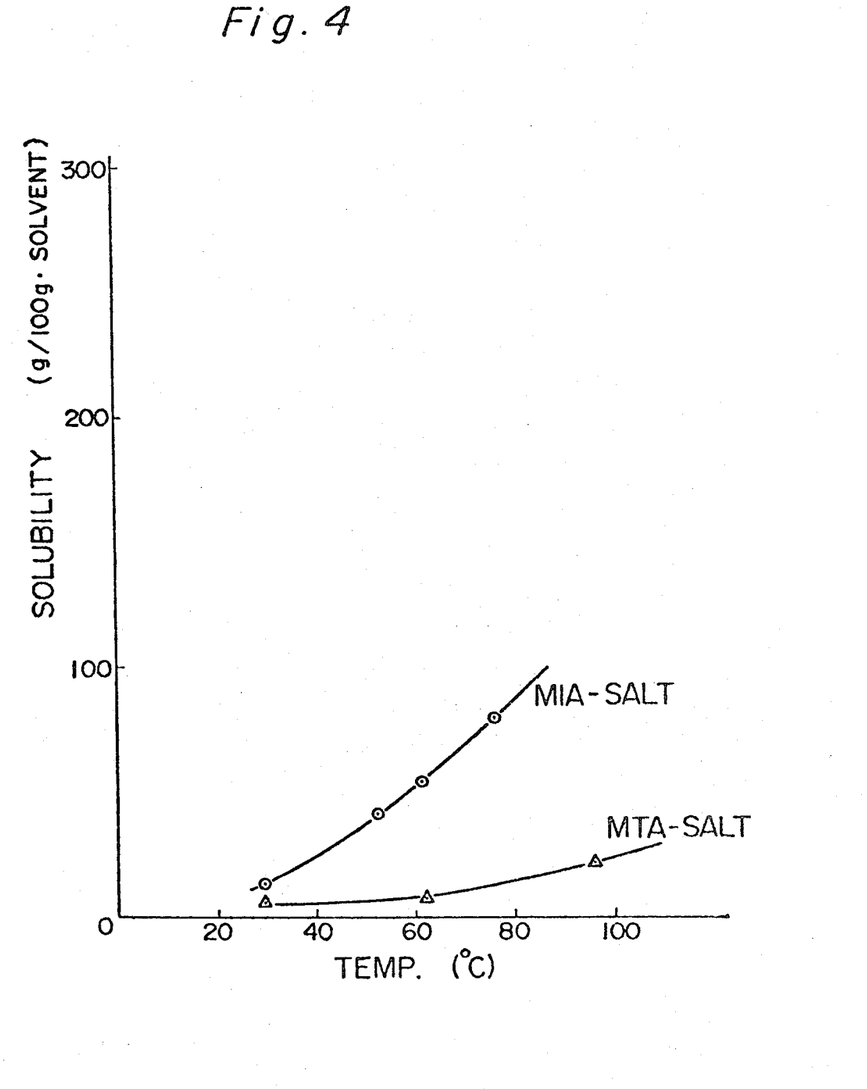

As clearly demonstrated in FIGS. 1 through 4, the salts of MTA and MIA respectively, e.g., diammonium salts taking the example of FIG. 1, exhibit a considerable difference in solubility in water (MIA salt shows greater solubility.), and, both the MTA salt and MIA salt show rapid increase in the dissolved amounts accompanying the temperature rise, for example, at about 60°C., particularly at 80°C. and above.

Consequently, by first converting a MTA—MIA mixture to the mixture of diammonium salts thereof, dissolving the salt mixture in a a amount of water at suitable temperature of 60°C. or above, and, for example, cooling the solution to any desired temperature, the conditions to allow precipitation of diammonium salt of MTA while leaving substantially the greater portion of the diammonium salt of MIA as dissolved can be very easily created, since the solubility of MIA-diammonium salt is considerably greater than that of MTA-diammonium salt, as is apparent from FIG. 1.

Incidentally, the precipitation of MTA salt is not necessarily achieved by cooling as in the above example, but may be effected by concentration of the solution of MTA salt and MIA salt at elevated temperatures to reduce the water content thereof. As the amount of water is reduced, in a manner similar to the above-described case of cooling, the conditions suited for precipitation of MTA salt while leaving substantially the greater part of the MIA salt having greater solubility as dissolved in water are created.

Consequently, the precipitation of MTA salt may also be effected by suitable combination of cooling and concentration.

So far the precipitation of diammonium salt of MTA from the mixture of diammonium salts of MTA and MIA has been explained referring mainly to FIG. 1. It will be understood from FIGS. 2 through 4 that, entirely identical methods can be applied to mixtures of hexamethylenediamine salts, dodecamethylenediamine salts, and p-xylylenediamine salts, of MTA and MIA, to precipitate the corresponding MTA salt. This is because, in all of the foregoing cases there is substantial difference in solubility between the MIA salt and MTA salt, the MIA salt invariably exhibiting considerably greater solubility than that of the MTA salt.

As already explained, specifically four bases among those useful for the invention are selected, and solubilities of their salts with respectively MTA and MIA in water are shown in FIGS. 1 through 4 for the purpose of illustration. It has been confirmed that any base selected from the afore-specified groups (a) through (e), in the form of salts with MTA and MIA, brings about the same results, i.e., solubilities of respective MTA salt and MIA salt in water show the similar tendency as illustrated in FIGS. 1 through 4, the solubilities of the two being considerably different the MIA salt always showing substantially greater solubility than that of the MTA salt.

It should be obvious that the specific conditions for individual practice such as which base should be used to form the salt of MTA—MIA mixture, temperature of dissolving the salt and amount of the water, temperature to be attained by cooling and/or amount of water to be distilled off by concentration, to precipitate the MTA salt, etc., can be suitably and easily determined by any expert, upon referring to the solubility curves given in FIGS. 1 through 4 attached to this specification, and determining in advance the solubilities in water of the salts of the base to be employed with, respectively, MTA and MIA. In fact, it has been confirmed, as demonstrated by later given working examples, that the results of precipitation of MTA salts from the aqueous solutions of the salts of MTA—MIA mixture with the above bases substantially correspond with the values derived from the solubility curves of those MTA salts and MIA salts in water as given in FIGS. 1 through 4.

Generally speaking, in dissolving the salt of MTA—MIA mixture with the base in water (obviously, the dissolving may be effected concurrently with the salt formation as already described), temperatures ranging approximately 60° – 100°C. are advantageous, and, if the precipitation of the MTA salt from the aqueous solution of salt mixture is to be achieved by cooling, normally it is preferred to cool the system to a suitable temperature within the range of approximately 10° – 50°C., from the initial temperature of the solution. Incidentally, the precipitation of MTA salt may be effected in plural stages.

When the starting MTA—MIA mixture contains water-insoluble impurities, preferably the impurities should be removed, when the salt of the mixture with the base is dissolved in water, by subjecting the aqueous solution to a suitable solid-liquid separation means, such as filtration. For example, when a MTA—MIA mixture obtained through oxidation in the presence of heavy metal compound such as of cobalt or manganese, as the catalyst, is reacted with the base to form the corresponding salt, occasionally the catalyst heavy metal compound remains in the system as water-insoluble impurities. Such impurities should preferably be removed from the aqueous solution of the salt.

It is again an advantageous practice to decolorize the aqueous solution, if necessary using activated carbon, etc., if the solution is colored.

The MTA salt, or MTA salt-MIA salt mixture containing the MTA salt at a higher concentration, as precipitated from the aqueous solution of salt of MTA—MIA mixture with the base, as above-described, can be separated and recovered by optional solid-liquid separation means such as filtration, centrifugation, centrifugal precipitation, etc.

When diamines such as hexamethylenediamine, dodecamethylenediamine, PACM, and p-xylylenediamine, are used as the base, the MTA salts with those bases themselves form so-called "nylon salts." Accordingly, such MTA salts can be polycondensed, as separated and recovered from the aqueous solution or after further purification, to be converted to polyamides.

Thus the conversion of the MTA—MIA mixture to the salt with the specific base selected from the groups (a) through (e) in accordance with the present invention has two important significances, one of which being that, upon conversion to such salt, a substantial difference is caused between the solubilities of the MTA salt and MIA salt in water, so that the two salts may be separated utilizing the difference in solubilities, and another being that, because some of the specified bases directly form nylon salts with MTA, the separated MTA salt can be used directly as the starting material for polyamides, etc., without intervening conversion to MTA.

According to our studies, when such diamines as 3-methyl hexamethylenediamine, m-xylylenediamine, o-, m-, or p-phenylenediamine, etc., are used as the base, the MTA salts and MIA salts with those bases either show no substantial difference in solubility in water, or have too high solubility, or the formation of salts per se is difficult, and in any case the MTA salt cannot be separated at higher concentrations. In contrast thereto, it is possible, only with the use of specified bases of groups (a) through (e), to precipitate and separate substantial amount of MTA salt in considerably pure form, or at notably increased concentrations, very smoothly and easily as above-described.

Furthermore, according to the invention, the separated MTA salt may be again dissolved in water, if desired, and cooled and/or concentrated to be once more precipitated as the MTA salt or salt mixture of higher MTA salt content. Obviously, the MTA salt content of the separated precipitate is still increased through such practice.

According to the invention, the separated and recovered MTA salt or MTA salt-MIA salt mixture containing MTA salt at increased concentration may be precipitated with addition of acid, if desired, to be converted to MTA or MTA—MIA mixture of increased MTA content.

This precipitation with addition of acid can be achieved by contacting the MTA salt or salt mixture of high MTA salt content with an acid or aqueous acid of stronger acidity than that of MTA, such as mineral acid, e.g., hydrochloric acid, sulfuric acid, nitric acid, etc., and separating the precipitated MTA or MTA-containing free acid by known solid-liquid separation means such as filtration, etc.

Again according to the invention, the mother liquor remaining after the separation of MTA salt or salt mixture of high MTA salt content from the aqueous solution of the salt of starting MTA-MIA mixture with at least one base of groups (a) throug (e), contains the MIA salt at higher concentrations. Therefore, by cooling and/or concentrating the mother liquor, MIA salt-MTA salt mixture containing MIA salt at higher concentrations than the MIA content in the starting mixture can be precipitated. The precipitate can be separated and recovered by known solid-liquid separation means such as filtration. The above precipitation may be performed at plural stages, if desired.

Again, the MIA-salt-containing mixture recovered from the mother liquor as above can be, in accordance with the invention, dissolved once more in water, and cooled and/or concentrated to cause precipitation of the MTA salt. The mother liquor remaining after the separation of the MTA salt can be subjected to the procedures as described above, to provide MIA salt-MTA salt mixture of still higher MIA salt content.

The recovery of the salt mixture containing the MIA salt at high concentration from the mother liquor may be effected, if desired, by evaporation of the liquor to dryness.

The obtained MIA salt containing a minor amount of MTA salt can be used for preparation of polyamides as it is, similarly to the already described usage of the MTA salt.

It is likewise possible to add a mineral acid such as hydrochloric or sulfuric acid or aqueous solution thereof as already mentioned, to the mother liquor containing the MIA salt at higher concentration, to cause precipitation of the MIA—MTA mixture of high MIA content from the mother liquor.

Similarly, the MIA salt-MTA salt mixture containing the MIA salt at higher concentration, recovered from the aforesaid mother liquor, can be subjected to the action of a similar acid, to be converted to a MIA—MTA mixture containing MIA at a higher concentration.

Thus according to the invention, it is possible to recover a substantially pure MTA salt or MTA from MTA—MIA mixtures, by applying the subject separation process to the mixture one or more times. According to the invention the MIA salt invariably has greater solubility in water than that of MTA salt, and consequently the MIA salt or MIA is always obtained by simple precipitation or with addition of acid, from the state of being dissolved in water. In that case, the MTA salt also is dissolved in the aqueous solution although to a minor extent (cf. FIGS. 1 – 4) without exception. Consequently the MIA salt or MIA separated and recovered from the aqeuous solution side always contains a minor amount of MTA salt or MTA.

Such MTA containing minor amount of MTA as recovered, or the MIA salt containing a minor amount of MTA salt which is subsequently converted to MTA-containing MIA by the action of acid, can be purified to almost 100 percent pure MIA, by recrystallization from a suitable solvent such as alcohols, e.g., methanol, ethanol, propanol; ethers such as diethyl ether, dioxane, tetrahydrofuran, methyl cellosolve, etc.; and organic carboxylic acids such as acetic acid, propionic acid, etc.

According to the invention, through the described method, MTA—MIA mixtures which are hardly separable by conventional means can be very easily separated as the MTA salt and MIA salt. Some of such MTA salt or MIA salt can be polycondensed as it is to form a polyamide. Again, if desired, the salts can be converted to MTA or MIA.

Hereinafter the invention will be explained with reference to the working Examples, which are given strictly for the purpose of assisting the understanding of this invention, and should never be construed to limit the scope of this invention. In the following Examples, parts and percentages are by weight, unless otherwise specified.

EXAMPLE 1

Ten parts of MTA—MIA mixture (mixing ratio: 63/37) were dissolved in 10 parts of 28 percent aqueous ammonia at 60°C. The water and excessive ammonia were removed under reduced pressure at 60°C., until the total amount of the solution was reduced to 19.4 parts. Then the system was cooled to 20°C., and the resulting suspension was filtered to separate it into solid and liquid. The solid and liquid, were each mixed with water, and to the aqueous solutions hydrochloric acid was added. The precipitated solids were recovered by filtration, thoroughly washed with water, and dried. The weight of dry solid obtained from the first precipitated solid phase was 5.8 parts, and that of the solid obtained from the liquid phase was 4.2 parts. The MTA/MIA ratios in the products were, when determined by gas chromatography of the products as converted to methyl ester using diazomethane, 95.8/4.2 as to that obtained from the solid phase, and 17.5/82.5 as to that obtained from the liquid phase.

EXAMPLES 2 – 12

MTA—MIA mixtures of various compositions as specified in Table 1 were subjected to the procedures described in Example 1, practiced at varied dissolving and separating temperatures again as specified in Table 1, using various bases such as ethylenediamine (ED), hexamethylenediamine (HMD), decamethylenediamine (MD–10), dodecamethylenediamine (MD–12), piperazine (PPZ), 1.4-diaminomethylcyclohexane (AMCH), bis-(4-aminocyclohexyl)methane (PACM), p-xylylenediamine (p-XD), and a mixture of p-xylylenediamine (p-XD) with m-xylylenediamine (m-XD) (p-XD/m-XD-70/30). The results were as shown in Table 1.

EXAMPLE 13

Ten parts of MTA—MIA mixture (mixing ratio: 57/43) were dissolved in 7.5 parts of 28 percent aqueous ammonia and 2.5 parts of water under heating. The water and excessive ammonia were removed at 60°C. under reduced pressure, until the total amount of the solution was reduced to 16.9 parts, and then the system was filtered at such temperature to separate it into solid and liquid. Both the solid phase and liquid phase were treated with acid similarly to Example 1, and the recovered precipipitates were analyzed. Dry weight of the precipitate recovered from the solution of solid phase was 4.4 parts, and that of the solid resulting from the liquid phase was 5.6 parts. The respective MTA/MIA ratios in the products were, 96.4/3.6 and 26.1/73.9.

When the suspension obtained by cooling the above-obtained liquid phase to 15°C. was filtered and separated into a solid and liquid and both were analyzed, the dry weight of the solid recovered from the solid phase was 2.9 parts, and that of the solid recovered from the liquid phase was 2.7 parts. The respective MTA/MIA ratios in the products were 42.7/57.3, and 8.2/91.8.

EXAMPLE 14 – 16

Through the procedures similar to Example 13, MTA—MIA mixtures of the compositions as specified in Table 2 were separated into the two components, with ammonia and hexamethylenediamine used as the bases. In those runs, however, the liquid phases separated from the solid phases were further cooled. As a result MTA-MIA mixtures of still higher MIA contents were obtained from the liquid phase side. The results are shown in Table 2.

EXAMPLES 17 and 18

The MTA—MIA mixtures separated from the reaction mixtures resulting from air-oxidation of pseudocumene in the presence of cobalt catalyst and acetic acid solvent, were subjected to the process of this invention under the conditions specified in Table 2. As the base, respectively ammonia and hexamethylenediamine were used. The results are shown in Table 2.

The starting MTA—MIA mixtures were composed of MTA and MIA at a ratio of 62.5/37.5. The MTA and MIA components together occupied 96.5 percent of the total mixture, the balance being the impurities such as dimethylbenzoic acid, cobalt trimellitate, etc.

EXAMPLE 19

One part of the MTA—MIA mixture (MTA/MIA = 16.6/83.4) obtained by drying the solid precipitated upon addition of acid in Example 3 was completely dissolved in 50 parts of methanol at 60°C., and thereafter cooled to 15°C. The resulting precipitate was recovered by filtration, and dried. The dry product weighed 0.69 part, which was converted to its methyl ester similarly to Example 1, and analyzed by means of gas chromatography. The MTA/MIA ratio was 1.5/98.5. Also the filtrate was 0.31 part after removal of methanol, of which the MTA/MIa ratio was 50.1/49.9.

We claim:
1. Process for separating and recovering salts of methylterephthalic acid at higher concentrations from mixtures of methylterephthalic acid and 4-methylisophthalic acid, which comprises dissolving a mixture of methylterephthalic acid and 4-methylisophthalic acid in water, in the form of the mixture of salts with at least one base selected from the group consisting of:
 a. ammonia,
 b. aliphatic, straight chain ω,ω'-diamines of an even number of carbon atoms within the range of 2 – 12,
 c. diamines of the formula,

$$H_2N-(CH_2)_n-\phi-(CH_2)_n-NH_2$$

in which n is a positive integer of 1 – 3, and $\phi$ is p-phenylene group or p-cyclohexylene groups,
 d. bis-(p-aminocyclohexyl) methane, and
 e. piperazine,
to form an aqueous solution of the salts of said acid mixture, concentrating the solution to cause precipitation of the methylterephthalic acid salt or salt mixture composed mainly of methylterephthalic acid salt, and separating the so precipitated salt or salt mixture.

2. The process of claim 1, wherein the separated methylterephthalic acid salt or the salt mixture composed mainly of methylterephthalic acid salt is treated with acid, and the precipitated methylterephthalic acid is separated.

3. The process of claim 1, wherein the 4-methylisophthalic acid salt or salt mixture of higher 4-methylisophthalic acid salt content is separated and recovered from the mother liquor obtained by separating the methylterephthalic acid salt or the salt mixture composed mainly of methylterephthalic acid salt from the aqueous solution of the salt of the starting acid mixture.

4. The process of claim 1, which further comprises treating the mother liquor obtained by separating from the aqueous solution of the salt of the starting mixture the precipitated methylterephthalic acid salt or the salt mixture composed mainly of methylterephthalic acid salt, with an acid, to precipitate 4-methylisophthalic acid or a mixture of 4-methylisophthalic acid and methylterephthalic acid containing the former at higher concentration, and separating the precipitate.

5. The process of claim 3, wherein said mother liquor is concentrated.

6. The process of claim 5, wherein said mother liquor, or the liquid residue remaining after separation of the solid precipitated upon concentration of the mother liquor, is evaporated to dryness.

7. The process of claim 1, wherein the starting mixture of methylterephthalic acid and 4-methylisophthalic acid contains at least 15 percent by weight, of methylterephthalic acid.

8. The process of claim 1, wherein the salt of the mixture of methylterephthalic acid and 4-methylisophthalic acid with ammonia of group (a) is composed of 2 mols of ammonia per mol of the acid mixture.

9. The process of claim 1, wherein the salt of the mixture of methylterephthalic acid and 4-methylisophthalic acid with at least one base selected from the groups (b) through (e) is composed of one mol of such base per mol of the acid mixture.

10. Process for separating and recovering salts of methylterephthalic acid at higher concentrations from mixtures of methylterephthalic acid and 4-methylisophthalic acid, which comprises dissolving a mixture of methylterephthalic acid and 4-methylisophthalic acid in water, in the form of the mixture of salts with at least one base selected from the group consisting of:
a. ammonia,
b. aliphatic, straight chain ω,ω'-diamines of an even number of carbon atoms within the range of 2–12,
c. diamines of the formula, $$H_2N-(CH_2)_n-\phi-(CH_2)_n-NH_2$$

in which n is a positive integer of 1–3, and $\phi$ is p-phenylene group or p-cyclohexylene groups,
d. bis-(p-aminocyclohexyl) methane, and
e. piperazine,
to form an aqueous solution of the salts of said acid mixture cooling the solution to cause precipitation of the methylterephthalic acid salt or salt mixture composed mainly of methylterephthalic acid salt, and separating the so precipitated salt or salt mixture.

11. The process of claim 10, wherein the separated methylterephthalic acid salt or the salt mixture composed mainly of methylterephthalic acid salt is treated with acid, and the precipitated methylterephthalic acid is separated.

12. The process of claim 10, wherein the 4-methylisophthalic acid salt or salt mixture of higher 4-methylisophthalic acid salt content is separated and recovered from the mother liquor obtained by separating the methylterephthalic acid salt or the salt mixture composed mainly of methylterephthalic acid salt from the aqueous solution of the salt of the starting acid mixture.

13. The process of claim 10, which further comprises treating the mother liquor obtained by separating from the aqueous solution of the salt of the starting mixture the precipitated methylterephthalic acid salt or the salt mixture composed mainly of methylterephthalic acid salt, with an acid, to precipitate 4-methylisophthalic acid or a mixture of 4-methylisophthalic acid and methylterephthalic acid containing the former at higher concentration, and separating the precipitate.

14. The process of claim 12, wherein said mother liquor is concentrated.

15. The process of claim 12, wherein said mother liquor is cooled.

16. The process of claim 12, wherein said mother liquor is concentrated and cooled.

17. The process of claim 14 wherein said mother liquor, or the liquid residue remaining after separation of the solid precipitated upon concentration of the mother liquor, is evaporated to dryness.

18. The process of claim 15, wherein said mother liquor, or the liquid residue remaining after separation of the solid precipitated upon cooling of the mother liquor, is evaporated to dryness.

19. The process of claim 16, wherein said mother liquor, or the liquid residue remaining after separation of the solid precipitated upon concentration and cooling of the mother liquor, is evaporated to dryness.

20. The process of claim 10, wherein the starting mixture of methylterephthalic acid and 4-methylisophthalic acid contains at least 15 percent by weight of methylterephthalic acid.

21. The process of claim 10, wherein the salt of the mixture of methylterephthalic acid and 4-methylisophthalic acid with ammonia of group (a) is composed of 2 mols of ammonia per mol of the acid mixture.

22. The process of claim 10, wherein the salt of the mixture of methylterephthalic acid and 4-methylisophthalic acid with at least one base selected from the groups (b) through (e) is composed of one mol of such base per mol of the acid mixture.

23. The process of claim 1, wherein the starting mixture of methylterephthalic acid and 4-methylisophthalic acid contains at least 25 percent by weight of methylterephthalic acid.

24. The process of claim 10, wherein the starting mixture of methylterephthalic acid and 4-methylisophthalic acid contains at least 25 percent by weight of methylterephthalic acid.

25. Process for separating and recovering salts of methylterephthalic acid at higher concentrations from mixtures of methylterephthalic acid and 4-methylisophthalic acid, which comprises dissolving a mixture of methylterephthalic acid and 4-methylisophthalic acid in water, in the form of the mixture of salts with at least one base selected from the group consisting of:
a. ammonia,
b. aliphatic, straight chain ω, ω'-diamines of an even number of carbon atoms within the range of 2–12,
c. diamines of the formula, $$H_2N-(CH_2)_n-\phi-(CH_2)_n-NH_2$$

in which n is a positive integer of 1–3, and $\phi$ is p-phenylene group or p-cyclohexylene groups,
d. bis-(p-aminocyclohexyl) methane, and
e. piperazine,
to form an aqueous solution of the salts of said acid mixture, concentrating and cooling the solution to cause precipitation of the methylterephthalic acid salt or salt mixture composed mainly of methylterephthalic acid salt, and separating the so precipitated salt or salt mixture.

26. The process of claim 25, wherein the separated methylterephthalic acid salt or the salt mixture composed mainly of methylterephthalic acid salt is treated with acid, and the precipitated methylterephthalic acid is separated.

27. The process of claim 25 wherein the 4-methylisophthalic acid salt or salt mixture of higher 4-methylisophthalic acid salt content is separated and recovered from the mother liquor obtained by separating the methylterephthalic acid salt or the salt mixture composed mainly of methylterephthalic acid salt from the aqueous solution of the salt of the starting acid mixture.

28. The process of claim 25, which further comprises treating the mother liquor obtained by separating from the aqueous solution of the salt of the starting mixture the precipitated methylterephthalic acid salt or the salt mixture composed mainly of methylterephthalic acid salt, with an acid, to precipitate 4-methylisophthalic acid or a mixture of 4-methylisophthalic acid and methylterephthalic acid containing the former at higher concentration, and separating the precipitate.

29. The process of claim 27 wherein said mother liquor is concentrated.

30. The process of claim 27 wherein said mother liquor is cooled.

31. The process of claim 27 wherein said mother liquor is concentrated and cooled.

32. The process of claim 29 wherein said mother liquor, or the liquid residue remaining after separation of the solid precipitated upon concentration of the mother liquor, is evaporated to dryness.

33. The process of claim 30 wherein said mother liquor, or the liquid residue remaining after separation of the solid precipitated upon cooling of the mother liquor, is evaporated to dryness.

34. The process of claim 31 wherein said mother liquor, or the liquid residue remaining after separation of the solid precipitated upon concentration and cooling of the mother liquor, is evaporated to dryness.

35. The process of claim 25 wherein the starting mixture of methylterephthalic acid and 4-methylisophthalic acid contains at least 15% by weight of methylterephthalic acid.

36. The process of claim 25 wherein the starting mixture of methylterephthalic acid and 4-methylisophthalic acid contains at least 25 percent by weight of methylterephthalic acid.

37. The process of claim 25 wherein the salt of the mixture of methylterephthalic acid and 4-methylisophthalic acid with ammonia of group (a) is composed of 2 mols of ammonia per mol of the acid mixture.

38. The process of claim 25 wherein the salt of the mixture of methylterephthalic acid and 4-methylisophthalic acid with at least one base selected from the groups (b) and (e) is composed of one mol of such base per mol of the acid mixture.

* * * * *